(12) United States Patent
Nomura (10) Patent No.: US 10,406,933 B2
(45) Date of Patent: Sep. 10, 2019

(54) VEHICLE

(71) Applicant: TOYOTA JIDOSHA KABUSHIKI KAISHA, Toyota-shi, Aichi-ken (JP)

(72) Inventor: Yoshihiro Nomura, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 100 days.

(21) Appl. No.: 15/697,586

(22) Filed: Sep. 7, 2017

(65) Prior Publication Data

US 2018/0072183 A1 Mar. 15, 2018

(30) Foreign Application Priority Data

Sep. 12, 2016 (JP) .................................. 2016-177722

(51) Int. Cl.
*B60L 11/18* (2006.01)
*B60L 3/00* (2019.01)
(Continued)

(52) U.S. Cl.
CPC ......... *B60L 11/1875* (2013.01); *B60L 3/0046* (2013.01); *B60L 50/51* (2019.02);
(Continued)

(58) Field of Classification Search
CPC .............. B60L 11/1875; B60L 3/0046; B60L 11/1818; B60L 11/1861; B60L 11/1879; B60L 2210/10; B60L 2240/54; B60L 2240/545;
H01M 10/425; H01M 10/46; H01M 10/615; H01M 10/625; H01M 10/63; H01M 2220/20; Y02T 10/7005; Y02T 10/705
(Continued)

(56) References Cited

U.S. PATENT DOCUMENTS

2012/0318783 A1\* 12/2012 Kamachi .............. H05B 1/0236
219/497
2013/0096760 A1 4/2013 Izumi
(Continued)

FOREIGN PATENT DOCUMENTS

JP 2009-043554 A 2/2009
JP 2012-190687 A 10/2012
(Continued)

*Primary Examiner* — Thienvu V Tran
*Assistant Examiner* — Brian K Baxter
(74) *Attorney, Agent, or Firm* — Finnegan, Henderson, Farabow, Garrett & Dunner, LLP (57) ABSTRACT

A vehicle includes: a battery charger configured to be able to perform external charging that charges a battery using electric power from an external power source; and a warming device configured to warm the battery, the warming device being connected to an electric power line connected to the battery. When temperature of the battery is less than a second prescribed temperature that is lower than a first prescribed temperature during execution of charging control that controls the battery charger to perform the external charging, warming control that controls the warming device to warm the battery is executed, and when the temperature of the battery is equal to or more than the second prescribed temperature, execution of the warming control is suppressed.

5 Claims, 8 Drawing Sheets

(51) Int. Cl.
- *H01M 10/615* (2014.01)
- *H01M 10/625* (2014.01)
- *H01M 10/63* (2014.01)
- *H01M 10/42* (2006.01)
- *H01M 10/46* (2006.01)
- *B60L 50/51* (2019.01)
- *B60L 58/27* (2019.01)
- *B60L 53/16* (2019.01)
- *B60L 58/12* (2019.01)
- *B60L 50/64* (2019.01)

(52) U.S. Cl.
CPC ............ *B60L 58/27* (2019.02); *H01M 10/425* (2013.01); *H01M 10/46* (2013.01); *H01M 10/615* (2015.04); *H01M 10/625* (2015.04); *H01M 10/63* (2015.04); *B60L 50/64* (2019.02); *B60L 53/16* (2019.02); *B60L 58/12* (2019.02); *B60L 2210/10* (2013.01); *B60L 2240/54* (2013.01); *B60L 2240/545* (2013.01); *H01M 2220/20* (2013.01); *Y02T 10/7005* (2013.01); *Y02T 10/705* (2013.01)

(58) Field of Classification Search
USPC ........................................................ 307/10.1
See application file for complete search history.

(56) References Cited

U.S. PATENT DOCUMENTS

| | | | | |
|---|---|---|---|---|
| 2013/0147424 A1* | 6/2013 | Takano | ............... | H01M 10/443 320/107 |
| 2013/0147432 A1* | 6/2013 | Yamamoto | ............ | H02J 7/0068 320/109 |
| 2013/0162027 A1* | 6/2013 | Yamamoto | ............ | H02J 7/0052 307/9.1 |
| 2013/0166119 A1* | 6/2013 | Kummer | ............. | H01M 10/443 701/22 |
| 2013/0302658 A1* | 11/2013 | Soga | ................... | B60L 11/1861 429/62 |
| 2013/0342015 A1* | 12/2013 | Takano | ................. | H01M 10/44 307/38 |
| 2014/0002025 A1* | 1/2014 | Yamamoto | .......... | H01M 10/443 320/109 |
| 2014/0180519 A1* | 6/2014 | Niimi | ..................... | B60K 6/445 701/22 |
| 2014/0266038 A1* | 9/2014 | Gibeau | ............... | B60L 11/1875 320/109 |
| 2014/0277869 A1* | 9/2014 | King | .................. | B60H 1/00278 701/22 |
| 2015/0028019 A1* | 1/2015 | Kamachi | ............. | B60H 1/2218 219/484 |
| 2015/0239405 A1* | 8/2015 | Kaihara | .............. | H01M 10/441 219/202 |
| 2015/0298568 A1 | 10/2015 | Mitsutani | | |
| 2016/0126760 A1* | 5/2016 | Murata | .................... | H02J 7/007 320/107 |
| 2017/0098874 A1* | 4/2017 | Shen | ................. | H01M 10/4207 |
| 2017/0120775 A1* | 5/2017 | Murata | ................. | B60K 6/48 |
| 2017/0217328 A1* | 8/2017 | Patel | ....................... | B60K 1/04 |
| 2017/0264108 A1* | 9/2017 | Ito | ........................ | H02J 7/0013 |
| 2017/0365901 A1* | 12/2017 | Hiramitsu | ........... | H01M 8/0432 |

FOREIGN PATENT DOCUMENTS

| | | |
|---|---|---|
| JP | 2014-82857 | 5/2014 |
| JP | 2015-220956 | 12/2015 |
| WO | WO 2012/004846 A1 | 1/2012 |
| WO | WO 2015/181614 A1 | 12/2015 |

\* cited by examiner

VEHICLE

INCORPORATION BY REFERENCE

The disclosure of Japanese Patent Application No. 2016-177722 filed on Sep. 12, 2016 including the specification, drawings and abstract is incorporated herein by reference in its entirety.

BACKGROUND OF THE INVENTION

1. Field of the Invention

The present invention relates to a vehicle.

2. Description of Related Art

As a vehicle of this type, there has conventionally been proposed a vehicle including a battery that supplies electric power to a traveling motor, a battery charger that charges the battery with electric power from an external power source, and warming means connected to an electric power line connected to the battery for warming the battery (see, for example, Japanese Patent Application Publication No. 2015-220956). In the vehicle, when the temperature of the battery is less than a warming target temperature during charging of the battery, the warming means is driven to increase the battery temperature. When a state of charge (SOC) of the battery is equal to or more than a current limit SOC, and the battery temperature is less than the warming target temperature, limited charging is performed which limits a charging current supplied from the battery charger to the battery within a prescribed current. Accordingly, in the case where the battery temperature does not reach the warming target temperature just before completion of the battery charging, the charging current is reduced to extend charging time so that the battery temperature reaches the warming target temperature at the time of completion of the battery charging.

SUMMARY OF THE INVENTION

In the vehicle, when the battery temperature is less than the warming target temperature, the warming means is driven even in the situation where driving the warming means is not enough to sufficiently increase the battery temperature due to such reasons as low outdoor temperature. In this case, since the battery is not sufficiently warmed by driving the warming means, driving the warming means (power consumption) may become useless.

A vehicle of the present invention suppresses excessive power consumption of a warming device of a battery during charging of the battery with electric power from an external power source.

A vehicle of the present invention includes: a battery configured to supply electric power to a traveling motor; a battery charger configured to be able to perform external charging that charges the battery using electric power from an external power source; a warming device configured to warm the battery, the warming device being connected to an electric power line that is connected to the battery; and a control device configured to control the battery charger and the warming device. The control device is configured to, during execution of charging control that controls the battery charger to perform the external charging, execute warming control that controls the warming device to warm the battery when temperature of the battery is less than a second prescribed temperature that is lower than a first prescribed temperature, and suppress execution of the warming control when the temperature of the battery is equal to or more than the second prescribed temperature.

In the vehicle of the present invention, during execution of charging control that controls the battery charger to perform external charging that charges the battery using electric power from an external power source, warming control that controls the warming device to warm the battery is executed when the temperature of the battery is less than the second prescribed temperature that is lower than the first prescribed temperature, and execution of the warming control is suppressed when the temperature of the battery is equal to or more than the second prescribed temperature. Therefore, when the temperature of the battery is less than the second prescribed temperature, the external charging control and the warming control are executed so that external charging can be performed while the battery is warmed. When the temperature of the battery is equal to or more than the second prescribed temperature, the external charging control is executed while the warming control is not executed. Accordingly, as compared with the case where the warming control is executed when the temperature of the battery is less than the first prescribed temperature (and equal to or more than the second prescribed temperature), it is possible to suppress excessive power consumption of the warming device of the battery in the situation where execution of the warming control is not enough to sufficiently increase the temperature of the battery due to such reasons as low outdoor temperature. It is also possible to suppress increase of the time taken for completing the external charging as compared with the case where execution of the warming control is continued till the temperature of the battery reaches the first prescribed temperature or more.

In such a vehicle of the present invention, the control device may be configured to, during execution of the charging control, execute the warming control when start time temperature that is the temperature of the battery when the external charging is started is equal to or more than the second prescribed temperature and the temperature of the battery is less than the first prescribed temperature, and execute the warming control when the start time temperature is less than the second prescribed temperature and the temperature of the battery is less than the second prescribed temperature. In this configuration, a temperature range of the battery wherein the warming control is executed can be changed in accordance with magnitude relation between the start time temperature and second prescribed temperature.

In the vehicle of the present invention, the control device may be configured to execute intermittent driving of the battery charger as the charging control based on any one of a state of charge, a voltage, and a charge-discharge current amount of the battery, when the temperature of the battery is less than the second prescribed temperature. In this configuration, the battery can be warmed while being charged or discharged. Since an output of the battery charger (electric power to charge the battery) during driving of the battery charger may be increased as compared with the case where the battery charger is continuously driven, the efficiency of the battery charger can be enhanced.

Furthermore, in the vehicle of the present invention, the second prescribed temperature may be a freezing temperature of an electrolyte of the battery. In this case, as described before, the warming control is executed when the temperature of the battery is less than the second prescribed temperature. This makes it possible to prevent or eliminate freezing of the electrolyte of the battery. Here, "freezing temperature" refers to an upper limit of a temperature range wherein the electrolyte may freeze.

In the vehicle of the present invention, the control device may be configured to: in the case where the start time temperature that is the temperature of the battery when the external charging is started is equal to or more than the second prescribed temperature, execute at first, as the charging control, first constant electric power control that controls the battery charger such that charging electric power of the battery becomes constant at a first prescribed electric power, execute second constant power control that controls the battery charger such that the charging electric power of the battery becomes constant at a second prescribed electric power that is smaller than the first prescribed electric power when a first condition where a state of charge or a voltage of the battery reaches a first threshold value or more is satisfied during execution of the first constant electric power control; and terminate the charging control when a second condition where the state of charge or the voltage of the battery reaches a second threshold value that is larger than the first threshold value or more is satisfied during execution of the second constant electric power control; and in the case where the start time temperature is less than the second prescribed temperature, execute at first, as the charging control, the first constant electric power control, execute the second constant electric power control when the first condition is satisfied and a prescribed-time temperature that is the temperature of the battery when the first condition is satisfied is equal to or more than the second prescribed temperature, terminate the charging control when the second condition is satisfied, execute the second constant electric power control after the temperature of the battery reaches the second prescribed temperature or more when the prescribed-time temperature is less than the second prescribed temperature; and terminate the charging control when the second condition is satisfied. Therefore, when the start time temperature is equal to or more than the second prescribed temperature, external charging can be performed by executing the first constant electric power control and the second constant electric power control in order. When the start time temperature is less than the second prescribed temperature, the first constant electric power control is executed, and then the second constant electric power control is executed when the prescribed-time temperature is equal to or more than the second prescribed temperature. Accordingly, it is possible to perform the external charging while the temperature of the battery can be increased to the second prescribed temperature or more.

In the vehicle of the present invention according to an aspect where the charging control is executed in accordance with magnitude relation between the start time temperature and the second prescribed temperature, the control device may be configured to, irrespective of the magnitude relation between the start time temperature and the second prescribed temperature, execute the warming control when the temperature of the battery is less than the first prescribed temperature during execution of the first constant electric power control, and execute the warming control when the temperature of the battery is less than the second prescribed temperature after the first condition is satisfied. In this configuration, as compared with the case where the warming control is executed when the temperature of the battery is less than the first prescribed temperature (and equal to or more than the second prescribed temperature) after the first condition is satisfied, it is possible to suppress excessive power consumption of the warming device of the battery in the situation where execution of the warming control is not enough to sufficiently increase the temperature of the battery due to such reasons as low outdoor temperature. It is also possible to suppress increase of the time taken for completing the external charging as compared with the case where execution of the warming control is continued till the temperature of the battery reaches the first prescribed temperature or more.

In this case, the control device may be configured to, when the prescribed-time temperature is less than the second prescribed temperature, execute intermittent driving of the battery charger as the charging control based on any one of a state of charge, a voltage, and a charge-discharge current amount of the battery till the temperature of the battery reaches the second prescribed temperature or more. In this configuration, it is possible to warm the battery while charging or discharging the battery until the temperature of the battery reaches the second prescribed temperature or more. Since the output of the battery charger (electric power to charge the battery) during driving of the battery charger may be increased as compared with the case where the battery charger is continuously driven, the efficiency of the battery charger can be enhanced.

In the vehicle of the present invention according to the aspect where the charging control is executed in accordance with the magnitude relation between the start time temperature and the second prescribed temperature, the control device may be configured to execute constant voltage control that controls the battery charger such that the voltage of the battery becomes constant at a prescribed voltage after execution of the first constant electric power control and before execution of the second constant electric power control. Generally, executing the constant voltage control causes gradual decrease in the charging current of the battery, which causes gradual decrease in the charging electric power of the battery. Therefore, such control allows smooth change in the charging electric power of the battery when the first constant electric power control shifts to the second constant electric power control.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Now, a mode for carrying out the present invention will be described in detail based on an embodiment.

Figure 1:
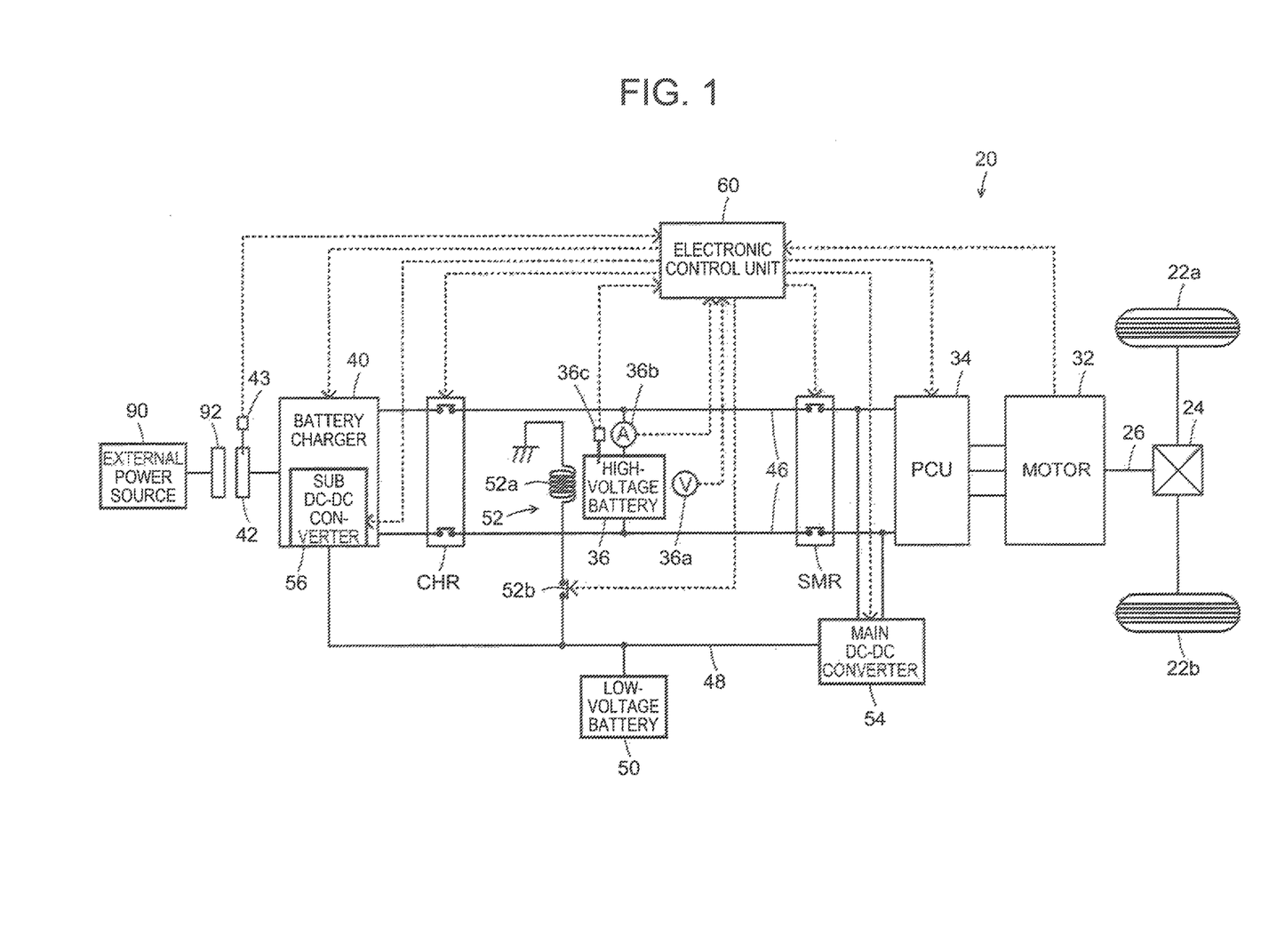
FIG. 1 is a block diagram illustrating an outlined configuration of an electric vehicle 20.

FIG. 1 is a block diagram illustrating an outlined configuration of an electric vehicle 20 as one embodiment of the present invention. As illustrated in the drawing, the electric vehicle 20 of the embodiment includes a motor 32, a power control unit (referred to as "PCU" below) 34, a high-voltage battery 36, a battery charger 40, a low-voltage battery 50, a heater 52, a main DC-DC converter 54, a sub DC-DC converter 56, a system main relay SMR, a charge relay CHR, and an electronic control unit 60.

For example, the motor 32 is configured as a synchronous generator-motor. The motor 32 is connected to a driving shaft 26 coupled to driving wheels 22a, 22b through a differential gear 24. The PCU 34, which is connected to a high voltage-side electric power line 46, includes an inverter used for driving the motor 32 and a smoothing capacitor attached to the high voltage-side electric power line 46. The motor 32 is rotationally driven by the electronic control unit 60 when the electronic control unit 60 controls switching of a plurality of switching elements of the inverter, which are not illustrated.

For example, the high-voltage battery 36 is configured as a lithium-ion secondary battery or a nickel-hydrogen secondary battery having such a rated voltage as 200V and 250V. As described before, the high-voltage battery 36 is connected with the PCU 34 through the high voltage-side electric power line 46.

The battery charger 40 is connected to the high voltage-side electric power line 46. The battery charger 40 is configured to be able to perform external charging that charges the high-voltage battery 36 with electric power from an external power source 90 at charging points, such as a residence and charging stations, when the system of the vehicle is turned off and a vehicle-side connector 42 connected to the battery charger 40 is connected with a power source-side connector 92 connected to the external power source 90. The battery charger 40 is controlled by the electronic control unit 60.

For example, the low-voltage battery 50 is configured as a lead storage batty having such a rated voltage as 12V and is connected to a low voltage-side electric power line 48. The low voltage-side electric power line 48 is connected to the heater 52 for warming the high-voltage battery 36. The heater 52 has a heating member 52a that generates heat with conduction resistance when current is conducted. One terminal of the heating member 52a is connected to the low voltage-side electric power line 48 through a switch 52b, while the other terminal of the heating member 52a is grounded.

The main DC-DC converter 54 is connected to the high voltage-side electric power line 46 and the low voltage-side electric power line 48. The main DC-DC converter 54 supplies to the low voltage-side electric power line 48 the electric power of the high voltage-side electric power line 46 whose voltage is stepped down under the control of the electronic control unit 60.

The sub DC-DC converter 56 is configured as a DC-DC converter smaller in rated output than the main DC-DC converter 54. The sub DC-DC converter 56 is connected to a portion of the high voltage-side electric power line 46 closer to the battery charger 40 side than the main DC-DC converter 54 and to the low voltage-side electric power line 48. In the embodiment, the sub DC-DC converter 56 is incorporated in the battery charger 40. The sub DC-DC converter 56 supplies to the low voltage-side electric power line 48 the electric power of the high voltage-side electric power line 46 whose voltage is stepped down under the control of the electronic control unit 60.

The system main relay SMR is provided between the high-voltage battery 36 and the PCU 34 or the main DC-DC converter 54 in the high voltage-side electric power line 46. The electronic control unit 60 performs on-off control of the system main relay SMR to provide connection and disconnection between the high-voltage battery 36 side and the side of the PCU 34 and the main DC-DC converter 54.

The charge relay CHR is provided between the high-voltage battery 36 and the battery charger 40 or the sub DC-DC converter 56 in the high voltage-side electric power line 46. The electronic control unit 60 performs on-off control of the charge relay CHR to provide connection and disconnection between the high-voltage battery 36 side and the side of the battery charger 40 and the sub DC-DC converter 56.

Although not illustrated, the electronic control unit 60 is configured as a microprocessor having a CPU as a main component. The electronic control unit 60 includes a ROM that stores processing programs, a RAM that temporarily stores data, and input and output ports in addition to the CPU.

The electronic control unit 60 receives signals from various sensors through the input port. For example, the signals input into the electronic control unit 60 include a rotational position of a rotator of the motor 32 from a rotational position sensor that detects the rotational position of the rotator of the motor 32, a voltage Vb of the high-voltage battery 36 from a voltage sensor 36a attached across the terminals of the high-voltage battery 36, a current Ib (which takes a positive value at the time of charging the high-voltage battery 36) of the high-voltage battery 36 from a current sensor 36b attached to an output terminal of the high-voltage battery 36, and a temperature Tb of the high-voltage battery 36 from a temperature sensor 36c attached to the high-voltage battery 36. The signals also include a connection detection signal from a connection detection sensor 43 that is attached to the vehicle-side connector 42 for detecting connection between the vehicle-side connector 42 and the power source-side connector 92. The signals further include an ignition signal from an ignition switch, a shift position SP from a shift position sensor, an accelerator opening from an accelerator pedal position sensor, a brake pedal position from a brake pedal position sensor, and a vehicle speed from a vehicle speed sensor.

The electronic control unit 60 outputs various control signals through the output port. For example, the signals output from the electronic control unit 60 include a control signal to the PCU 34 (inverter), a control signal to the battery charger 40, a control signal to the heater 52 (switch 52b), a control signal to the main DC-DC converter 54, a control signal to the sub DC-DC converter 56, a control signal to the system main relay SMR, and a control signal to the charge relay CHR.

The electronic control unit 60 calculates the state of charge SOC of the high-voltage battery 36 based on an integrated value of the current Ib of the high-voltage battery 36 from the current sensor 36b. At the time of external charging, the electronic control unit 60 calculates a charging electric power Pch of the high-voltage battery 36 as a product of the voltage Vb of the high-voltage battery 36 from the voltage sensor 36a and the current Ib of the high-voltage battery 36 from the current sensor 36b.

In the electric vehicle 20 in the embodiment configured in this way, the electronic control unit 60 turns on the charge relay CHR to perform external charging that charges the high-voltage battery 36 with the electric power from the external power source 90, when the vehicle-side connector 42 and the power source-side connector 92 are connected (when the connection detection sensor 43 detects connection between both the connectors) while the vehicle is parked at charging points, such as a residence and a charging station, with the system being turned off.

Figure 2:
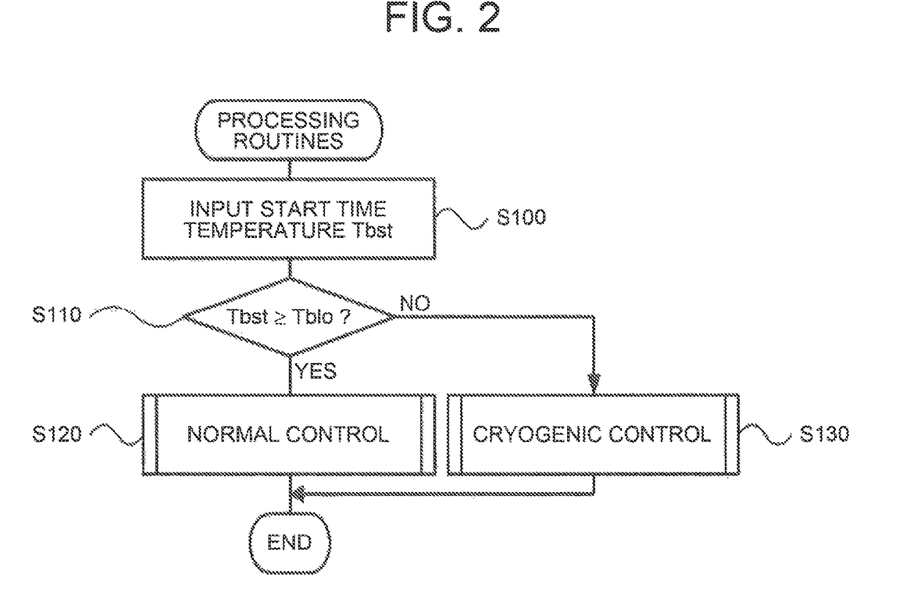
FIG. 2 is a flowchart illustrating one example of processing routine.

Now a description is given of operation of the thus-configured electric vehicle 20 of the embodiment, and more particularly the operation at the time of external charging. FIG. 2 is a flowchart illustrating one example of a processing routine executed by the electronic control unit 60 in the embodiment. The routine is executed at the time when the external charging is started (when the charge relay CHR is turned on).

When the processing routines of FIG. 2 is executed, the electronic control unit 60 inputs a start time temperature Tbst of the high-voltage battery 36 (step S100). Here, the start time temperature Tbst of the high-voltage battery 36 to be input is a value detected by the temperature sensor 36c when external charging is started.

When the start time temperature Tbst of the high-voltage battery 36 is input in this way, the input start time temperature Tbst is compared with a prescribed temperature Tblo that is lower than a prescribed temperature Tbno (step S110). Here, the prescribed temperatures Tbno and Tblo are first and second warming target temperatures of the high-voltage battery 36. For example, the prescribed temperature Tbno may take such values as 6° C., 8° C., and 10° C. The prescribed temperature Tblo may take such values as −17° C., −15° C., and −13° C. In the embodiment, used as the prescribed temperature Tblo is a freezing temperature of the electrolyte of the high-voltage battery 36 (an upper limit of the temperature range where the electrolyte may freeze).

Figure 3:
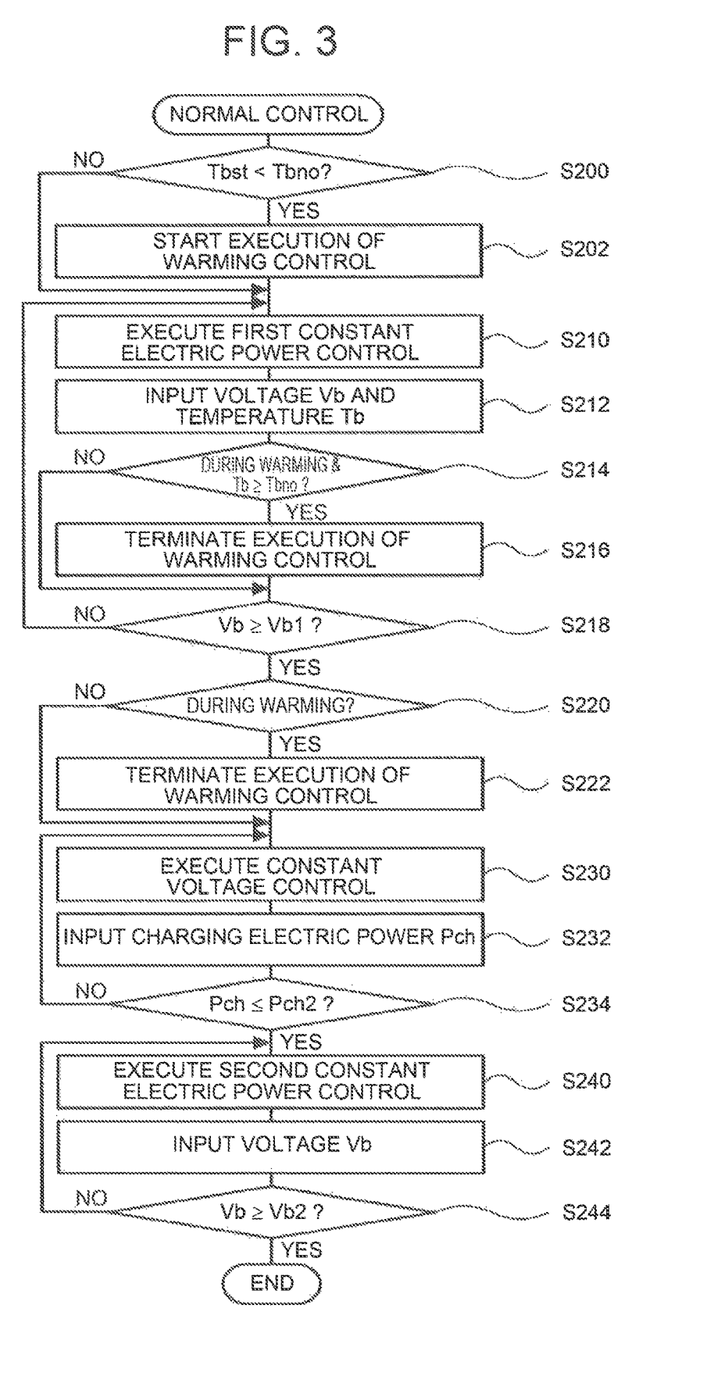
FIG. 3 is a flowchart illustrating one example of normal control.

When the start time temperature Tbst of the high-voltage battery 36 is equal to or more than the prescribed temperature Tblo, normal control of FIG. 3 is executed (step S120), and the present routine is ended. When the start time temperature Tbst of the high-voltage battery 36 is less than the prescribed temperature Tblo, cryogenic control in FIGS. 4 and 5 (step S130) is executed, and the present routine is ended. In the normal control of FIG. 3, and the cryogenic control of FIGS. 4 and 5, charging control that controls the battery charger 40 to perform external charging is executed, and also warming control that controls the heater 52 to warm the high-voltage battery 36 is executed as necessary. Hereinafter, the normal control of FIG. 3 and the cryogenic control of FIGS. 4 and 5 will be described in order.

In the normal control of FIG. 3, the electronic control unit 60 first compares the start time temperature Tbst of the high-voltage battery 36 with a prescribed temperature Tbno (step S200). When the start time temperature Tbst of the high-voltage battery 36 is less than the prescribed temperature Tbno, the electronic control unit 60 starts execution of the warming control (step S202). When the start time temperature Tbst of the high-voltage battery 36 is equal to or more than the prescribed temperature Tbno, the electronic control unit 60 does not execute the warming control. In the warming control, the switch 52b of the heater 52 is turned on to make the heating member 52a generate heat by application of current, so that the high-voltage battery 36 is warmed. The power consumption of the heater 52 is covered by the electric power supplied from the low-voltage battery 50 or the electric power supplied to the low voltage-side electric power line 48 from the high-voltage battery 36 through the main DC-DC converter 54. An absolute value of the power consumption of the heater 52 is smaller than an absolute value of output electric power of the battery charger 40 when later-described first constant electric power control is performed.

Next, the first constant electric power control is executed (step S210). In first constant electric power control, the battery charger 40 is controlled such that the charging electric power Pch of the high-voltage battery 36 becomes constant at prescribed electric power Pch1. The prescribed electric power Pch1 is set based on parameters such as allowable output electric power of the external power source 90 and allowable input electronic power of the high-voltage battery 36. For example, the prescribed electric power Pch1 may take such values as 2.5 kW, 3.0 kW, and 3.5 kW. When the first constant electric power control is executed, the voltage Vb (state of charge SOC) of the high-voltage battery 36 becomes gradually larger, and the current Ib of the high-voltage battery 36 becomes gradually smaller.

Next, the voltage Vb of the high-voltage battery 36 from the voltage sensor 36a and the temperature Tb of the high-voltage battery 36 from the temperature sensor 36c are input (step S212). It is determined whether or not the warming control is under execution and the temperature Tb of the high-voltage battery 36 is equal to or more than the prescribed temperature Tbno (step S214). When the warming control is under execution and the temperature Tb of the high-voltage battery 36 is equal to or more than the prescribed temperature Tbno, execution of the warming control is terminated (step S216). When the warming control is not under execution, or when the warming control is under execution and the temperature Tb of the high-voltage battery 36 is less than the prescribed temperature Tbno, processing of step S216 is not executed (the state where the warming control is not under execution or the state where the warming control is under execution is maintained).

Then, the voltage Vb of the high-voltage battery 36 is compared with a prescribed voltage Vb1 (step S218). When the voltage Vb of the high-voltage battery 36 is less than the prescribed voltage Vb1, the processing returns to step S210. Here, the prescribed voltage Vb1 is a threshold value used for determining whether or not to terminate execution of the first constant electric power control. For example, the prescribed voltage Vb1 may take such a value that corresponds to a voltage Vb of the high-voltage battery 36 when the high-voltage battery 36 is fully charged by execution of the first constant electric power control.

In this way, the first constant electric power control is executed until the voltage Vb of the high-voltage battery 36 reaches the prescribed voltage Vb1 or more. When the voltage Vb of the high-voltage battery 36 reaches the prescribed voltage Vb1 or more in step S218, the warming control, if it is under execution, is terminated (steps S220, S222). During execution of the normal control of FIG. 3, the start time temperature Tbst of the high-voltage battery 36 is equal to or more than the prescribed temperature Tblo. Accordingly, it can be considered that the temperature Tb (referred to as "prescribed-time temperature Tbti" below) of the high-voltage battery 36 when the voltage Vb of the high-voltage battery 36 reaches the prescribed voltage Vb1 or more (when execution of the first constant electric power control is terminated) during execution of the first constant electric power control is also equal to or more than the prescribed temperature Tblo. In the embodiment, when the voltage Vb of the high-voltage battery 36 reaches the prescribed voltage Vb1 or more during execution of the first constant electric power control, the warming control is terminated even in the case where the prescribed-time temperature Tbti of the high-voltage battery 36 is less than the prescribed temperature Tbno. Accordingly, as compared with the case where the warming control is executed until the temperature Tb of the high-voltage battery 36 reaches the prescribed temperature Tbno or more, it is possible to suppress excessive power consumption of the heater 52 in the situation where execution of the warming control is not enough to sufficiently increase the temperature Tb of the high-voltage battery 36 due to such reasons as low outdoor temperature. Moreover, as compared with the case where execution of the warming control is continued and the external charging is not terminated until the temperature Tb of the high-voltage battery 36 reaches the prescribed temperature Tbno or more, it is possible to suppress prolonged time taken to terminate the external charging.

Next, constant voltage control is executed (step S230). In the constant voltage control, the battery charger 40 is controlled such that the voltage Vb of the high-voltage battery 36 becomes constant at the prescribed voltage Vb1. When the constant voltage control is executed, the current Ib of the high-voltage battery 36 becomes gradually smaller, and the charging electric power Pch of the high-voltage battery 36 becomes gradually smaller.

Then, the charging electric power Pch of the high-voltage battery 36 calculated as a product of the voltage Vb of the high-voltage battery 36 from the voltage sensor 36a and the current Ib of the high-voltage battery 36 from the current sensor 36b is input (step S232). The input charging electric power Pch of the high-voltage battery 36 is compared with prescribed electric power Pch2 that is smaller than the prescribed electric power Pch1 (step S234). When the charging electric power Pch of the high-voltage battery 36 is larger than the prescribed electric power Pch2, the processing returns to step S230. Here, the prescribed electric power Pch2 may take such values as 600 W, 650 W and 700 W, for example.

In this way, the constant voltage control is executed until the charging electric power Pch of the high-voltage battery 36 reaches the prescribed electric power Pch2 or less. When the charging electric power Pch of the high-voltage battery 36 reaches the prescribed electric power Pch2 or less in step S234, the second constant electric power control is executed (step S240). In the second constant electric power control, the battery charger 40 is controlled such that the charging electric power Pch of the high-voltage battery 36 becomes constant at the prescribed electric power Pch2. When the second constant electric power control is executed, the voltage Vb (state of charge SOC) of the high-voltage battery 36 becomes gradually larger, and the current Ib of the high-voltage battery 36 becomes gradually smaller.

Next, the voltage Vb of the high-voltage battery 36 is input (step S242). The input voltage Vb of the high-voltage battery 36 is compared with the prescribed voltage Vb2 that is larger than the prescribed voltage Vb1 (step S244). When the voltage Vb of the high-voltage battery 36 is less than the prescribed voltage Vb2, the processing returns to step S240. Here, the prescribed voltage Vb2 is a threshold value used for determining whether or not to terminate execution of the second constant electric power control and to terminate the external charging. For example, the prescribed voltage Vb2 may take such a value that corresponds to a voltage Vb of the high-voltage battery 36 when the high-voltage battery 36 is fully charged by execution of the second constant electric power control.

In this way, the second constant electric power control is executed until the voltage Vb of the high-voltage battery 36 reaches the prescribed voltage Vb2 or more. When the voltage Vb of the high-voltage battery 36 reaches the prescribed voltage Vb2 or more in step S244, it is determined that the external charging is completed and the present routine is ended. In the normal control, the constant voltage control is executed after execution of the first constant electric power control and before execution of the second constant electric power control. Accordingly, during shifting from the first constant electric power control to the second constant electric power control, the charging electric power Pch of the high-voltage battery 36 can smoothly be changed.

Figure 4:
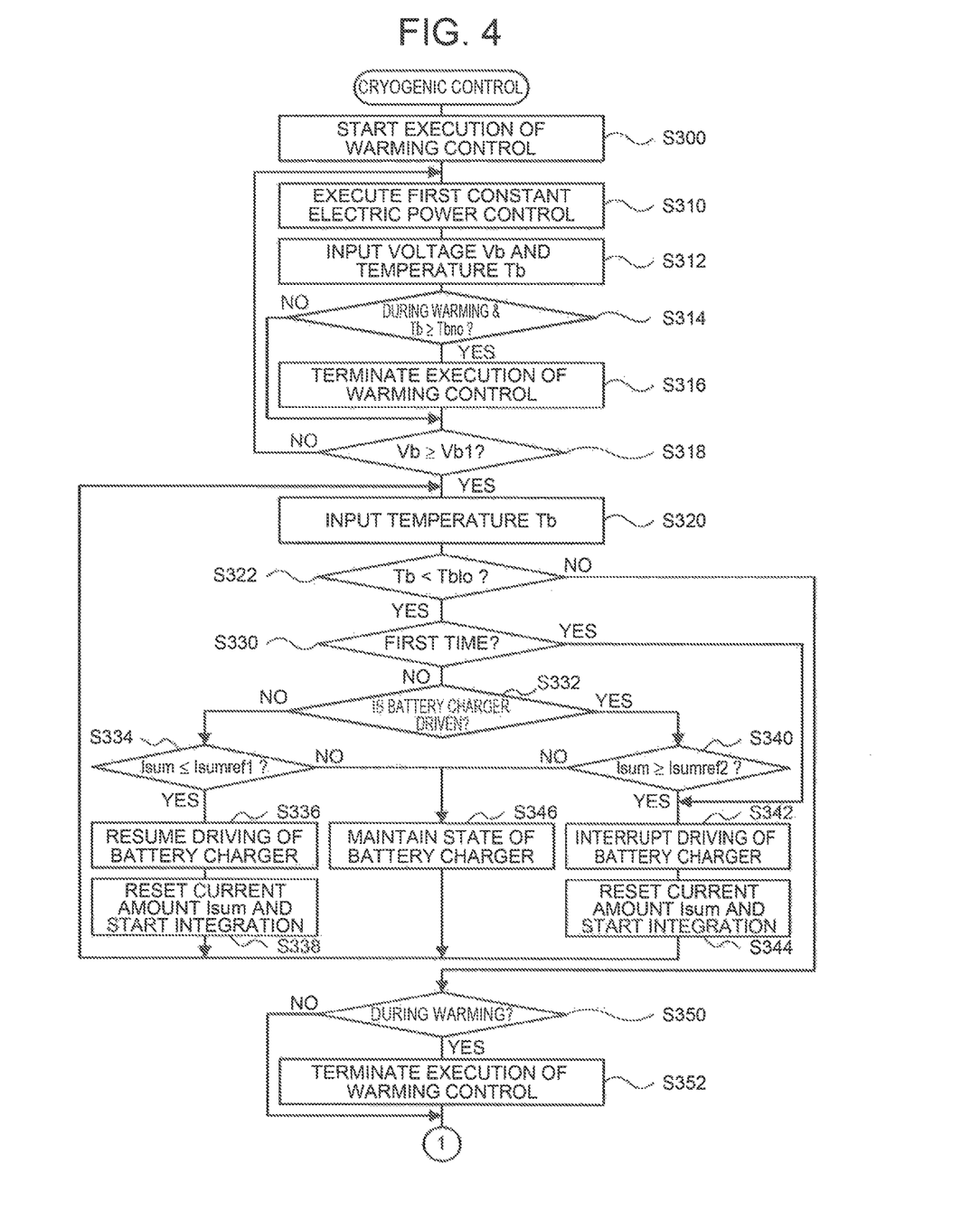
FIG. 4 is a flowchart illustrating one example of cryogenic control.
Figure 5:
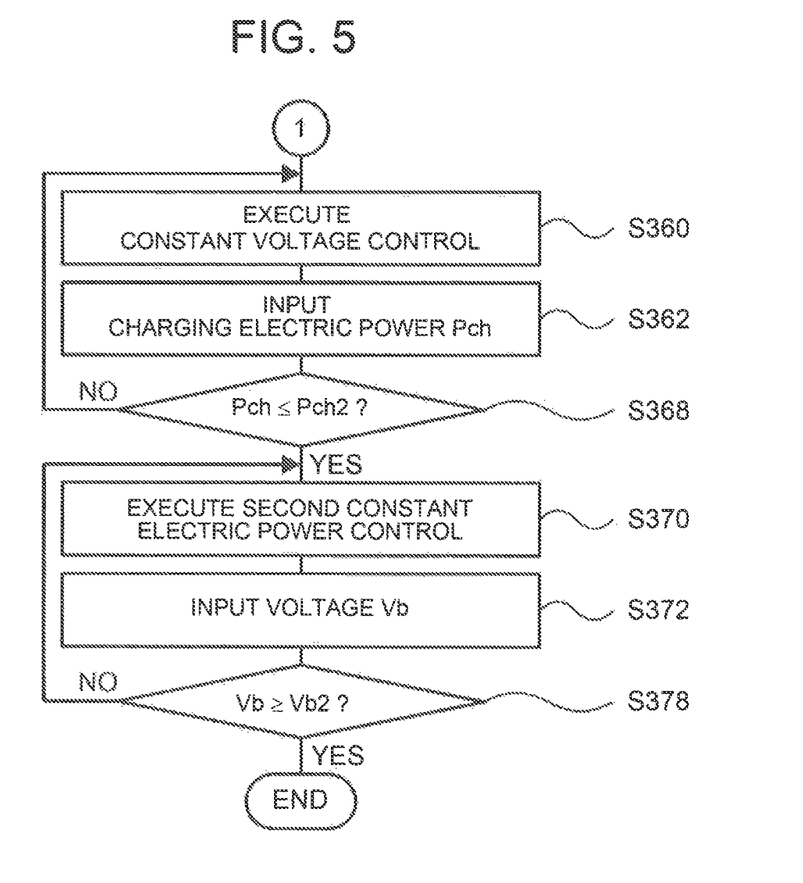
FIG. 5 is a flowchart illustrating one example of the cryogenic control.

A description is now given of the cryogenic control in FIGS. 4 and 5. The cryogenic control is executed when the start time temperature Tbst of the high-voltage battery 36 is less than the prescribed temperature Tblo (<Tbno). First, the electronic control unit 60 starts execution of the warming control (step S300).

Next, as in the case of steps S210 to S218 of the normal control in FIG. 3, the first constant electric power control is executed (step S310). The voltage Vb and the temperature Tb of the high-voltage battery 36 are input (step S312). Execution of the warming control is terminated. The state where the warming control is not executed or the state where the warming control is executed is maintained (steps S314, S316). The voltage Vb of the high-voltage battery 36 is compared with the prescribed voltage Vb1 (step S318). When the voltage Vb of the high-voltage battery 36 is less than the prescribed voltage Vb1, the processing returns to step S310. Since the processing is assumed to be performed in the case where the start time temperature Tbst of the high-voltage battery 36 is less than the prescribed temperature Tblo, it is considered to be unlikely that the temperature Tb of the high-voltage battery 36 reaches a prescribed temperature Tbno or more during execution of the first constant electric power control, the prescribed temperature Tbno being higher than the prescribed temperature Tblo.

In this way, the first constant electric power control is executed until the voltage Vb of the high-voltage battery 36 reaches the prescribed voltage Vb1 or more. When the voltage Vb of the high-voltage battery 36 reaches the prescribed voltage Vb1 or more in step S318, the temperature Tb of the high-voltage battery 36 is input (step S320), and the input temperature Tb of the high-voltage battery 36 is compared with the prescribed temperature Tblo (step S322). As described in the foregoing, the temperature Tb of the high-voltage battery 36 when the voltage Vb of the high-voltage battery 36 reaches the prescribed voltage Vb or more (when execution of the first constant electric power control is terminated) during execution of first constant electric power control is referred to as "prescribed-time temperature Tbti."

When the temperature Tb (prescribed-time temperature Tbti) of the high-voltage battery 36 is equal to or more than the prescribed temperature Tblo in step S322, execution of the warming control is terminated if the warming control is under execution (steps S350, S352). Accordingly, as compared with the case where the warming control is executed until the temperature Tb of the high-voltage battery 36 reaches the prescribed temperature Tbno or more, it is possible to suppress excessive power consumption of the heater 52 in the situation where execution of the warming control is not enough to sufficiently increase the temperature Tb of the high-voltage battery 36 due to such reasons as low outdoor temperature. Moreover, as compared with the case where execution of the warming control is continued and the external charging is not terminated until the temperature Tb of the high-voltage battery 36 reaches the prescribed temperature Tbno or more, it is possible to suppress prolonged time taken to terminate the external charging.

Next, as in the case of steps S230 to S234 of the normal control in FIG. 3, constant voltage control is executed (step S360), the charging electric power Pch of the high-voltage battery 36 is input (step S362), and the charging electric power Pch of the high-voltage battery 36 is compared with the prescribed electric power Pch2 (<Pch1) (step S368). When the charging electric power Pch of the high-voltage battery 36 is larger than the prescribed electric power Pch2, the processing returns to step S360.

In this way, the constant voltage control is executed until the charging electric power Pch of the high-voltage battery 36 reaches the prescribed electric power Pch2 or less. When the charging electric power Pch of the high-voltage battery 36 reaches the prescribed electric power Pch2 or less in step S368, the second constant electric power control is executed (step S370), the voltage Vb of the high-voltage battery 36 is input (step S372), and the voltage Vb of the high-voltage battery 36 is compared with the prescribed voltage Vb2 (step S378) as in steps S240 to S244 of the normal control in FIG. 3. When the voltage Vb of the high-voltage battery 36 is less than the prescribed voltage Vb2, the processing returns to step S240.

In this way, the second constant electric power control is executed until the voltage Vb of the high-voltage battery 36 reaches the prescribed voltage Vb2 or more. When the voltage Vb of the high-voltage battery 36 reaches the prescribed voltage Vb2 or more in step S378, it is determined that the external charging is completed and the present routine is ended. In the cryogenic control, the constant voltage control is also executed after execution of the first constant electric power control and before execution of the second constant electric power control as in the normal control. Accordingly, during shifting from the first constant electric power control to the second constant electric power control, the charging electric power Pch of the high-voltage battery 36 can smoothly be changed.

When the temperature Tb (prescribed-time temperature Tbti) of the high-voltage battery 36 is less than the prescribed temperature Tblo in step S322, execution of the warming control is continued, and intermittent driving of the battery charger 40 is performed (steps S330 to S346). Then when the temperature Tb of the high-voltage battery 36 reaches the prescribed temperature Tblo or more in step S322, processing subsequent to step S350 is executed. That is, when the prescribed-time temperature Tbti of the high-voltage battery 36 is less than the prescribed temperature Tblo, the warming control is executed until the temperature Tb of the high-voltage battery 36 reaches the prescribed temperature Tblo or more. This makes it possible to prevent or eliminate freezing of the electrolyte of the high-voltage battery 36. Hereinafter, the intermittent driving of the battery charger 40 will be described.

When the intermittent driving of the battery charger 40 is performed, it is first determined whether or not it is the first time (whether or not it is immediately after the voltage Vb of the high-voltage battery 36 reaches the prescribed voltage Vb1 or more during execution of the first constant electric power control) (step S330). When it is the first time, driving of the battery charger 40 is interrupted (stopped) (step S342), a current amount Isum as an integrated value of the current Ib (which takes a positive value at the time of charging the high-voltage battery 36) of the high-voltage battery 36 is reset to a value zero, and then integration is restarted (step S344). When driving of the battery charger 40 is interrupted, an output of the battery charger 40 becomes a value zero (the electric power supplied from the battery charger 40 to the low voltage-side electric power line 48 through the sub DC-DC converter 56 also becomes a value zero). Accordingly, in order to cover the power consumption of the heater 52, electric power is supplied from the high-voltage battery 36 to the low voltage-side electric power line 48 through the main DC-DC converter 54. That is, as driving of the battery charger 40 is continuously interrupted, a negative current amount Isum becomes larger.

When it is determined that it is not the first time in step S330, it is then determined whether or not the battery charger 40 is driven (step S332). When it is determined that the battery charger 40 is not driven (driving is interrupted), the current amount Isum of the high-voltage battery 36 is compared with a negative threshold value Isumref1 (step S334). When the current amount Isum of the high-voltage battery 36 is larger than the threshold value Isumref1 (which is small as an absolute value), the state of the battery charger 40 is maintained (step S346), and the processing returns to step S320. In this case, driving of the battery charger 40 is continuously interrupted. When the current amount Isum of the high-voltage battery 36 is equal to or less than the threshold value Isumref1, driving of the battery charger 40 is resumed (step S336), the current amount Isum is reset to the value zero, and then integration is restarted (step S338). Then, the processing returns to step S320. When the battery charger 40 is driven, the steps similar to those in the first constant electric power control are performed, for example. Thus, the threshold value Isumref1 is a threshold value used for determining whether to continuously interrupt the driving of the battery charger 40 or to resume the driving.

When it is determined that the battery charger 40 is driven in step S332, the current amount Isum of the high-voltage battery 36 is compared with a positive threshold value Isumref2 (step S340). When the current amount Isum of the high-voltage battery 36 is smaller than the threshold value Isumref2, the state of the battery charger 40 is maintained (step S346), and the processing returns to step S320. In this case, driving of the battery charger 40 is continuously interrupted. When the current amount Isum of the high-voltage battery 36 is equal to or more than the threshold values Isumref2, driving of the battery charger 40 is interrupted (step S342), the current amount Isum is reset to the value zero, and integration is started (step S344). Then, the processing returns to step S320. Thus, threshold value Isumref2 is a threshold value used for determining whether to continue or interrupt driving of the battery charger 40. In order to suppress overvoltage and overcharge of the high-voltage battery 36, the threshold value Isumref2 is set to a value whose absolute value is identical to the threshold value Isumref1 and whose sign is inverted from the threshold value Isumref1.

In the embodiment, the intermittent driving of the battery charger 40 is performed in this way. When intermittent driving of the battery charger 40 is performed, the output of the battery charger 40 during driving of the battery charger 40 can be increased as compared with the case of continuously driving the battery charger 40. This makes it possible to enhance the efficiency of the battery charger 40.

Figure 6:
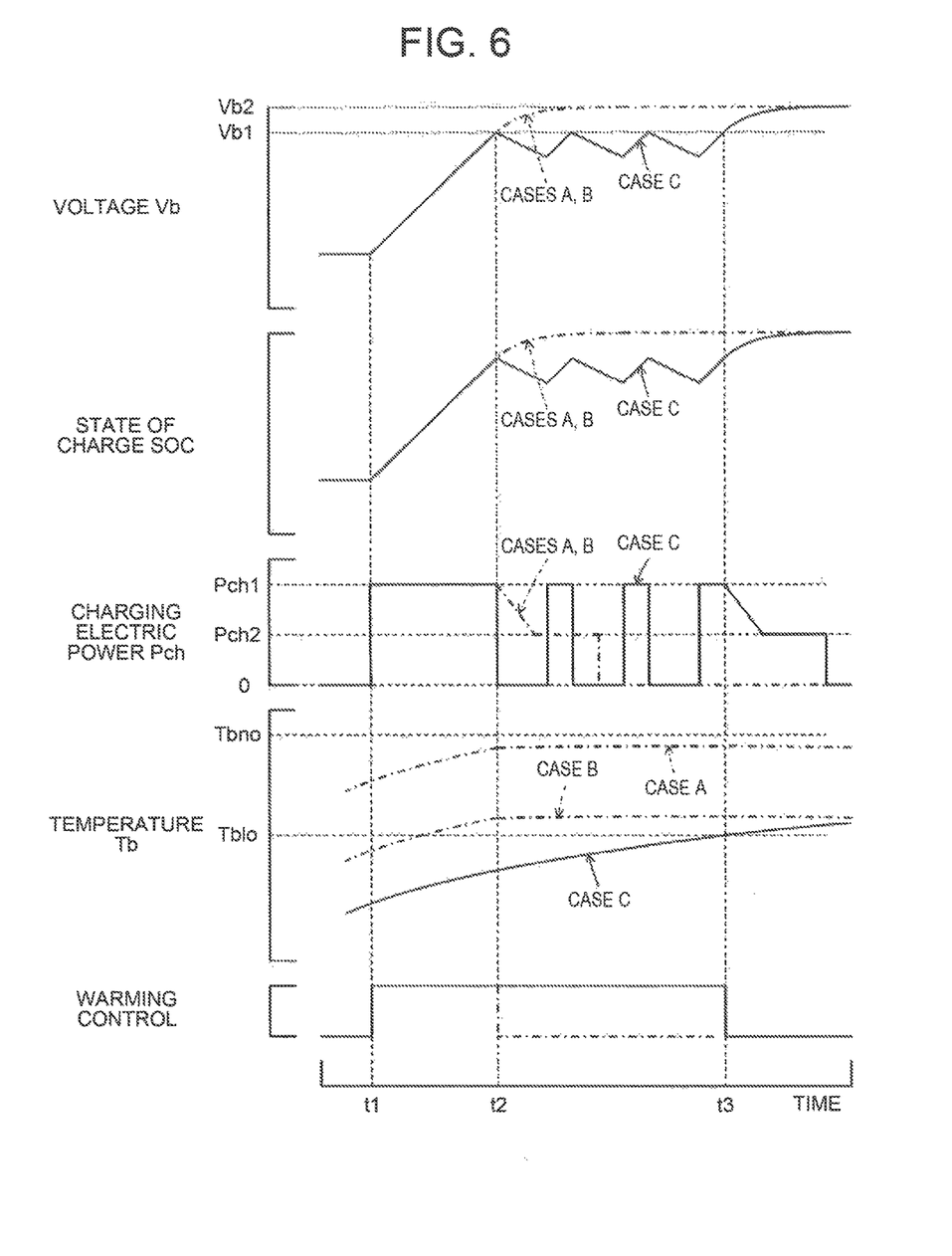
FIG. 6 is an explanatory view illustrating one example of a voltage Vb, a state of charge SOC, a charging electric power Pch, a temperature Tb, and presence of execution of warming control of a high-voltage battery 36 when external charging is performed.

FIG. 6 is an explanatory view illustrating one example of the voltage Vb, the state of charge SOC, the charging electric power Pch, the temperature Tb, and presence of execution of warming control of the high-voltage battery 36 when external charging is performed. In the drawing, a "case A" represents the case where the start time temperature Tbst of the high-voltage battery 36 is equal to or more than the prescribed temperature Tblo. A "case B" represents the case where the start time temperature Tbst of the high-voltage battery 36 is less than the prescribed temperature Tblo and the prescribed-time temperature Tbti is equal to or more than the prescribed temperature Tblo. A "case C" represents the case where both the start time temperature Tbst and the prescribed-time temperature Tbti of the high-voltage battery 36 are less than the prescribed temperature Tblo. The cases A and B are illustrated with dashed dotted lines, and the case C is illustrated with solid lines.

In each of the cases A, B, and C, the warming control is executed when the temperature Tb of the high-voltage battery 36 is less than the prescribed temperature Tbno while the first constant electric power control is under execution (time t1 to t2). In the cases A and B, when the voltage Vb of the battery 36 reaches the prescribed voltage Vb1 or more at time t2, the prescribed-time temperature Tbti of the high-voltage battery 36 is equal to or more than the prescribed temperature Tblo. Accordingly, the warming control is terminated, the constant voltage control and the second constant electric power control are executed, and then the external charging is terminated. In the case C, the prescribed-time temperature Tbti of the high-voltage battery 36 is less than the prescribed temperature Tblo at time t2. Accordingly, execution of the warming control is continued while intermittent driving of the battery charger 40 is performed. When the temperature Tb of the high-voltage battery 36 reaches the prescribed temperature Tblo or more at time t3, the warming control is terminated, the constant voltage control and the second constant electric power control are executed, and then the external charging is terminated. Accordingly, in each of the cases A, B, and C, as compared with the case where the warming control is executed until the temperature Tb of the high-voltage battery 36 reaches the prescribed temperature Tbno or more, it is possible to suppress excessive power consumption of the heater 52 in the situation where execution of the warming control is not enough to sufficiently increase the temperature Tb of the high-voltage battery 36 due to such reasons as low outdoor temperature. Moreover, as compared with the case where the warming control is continuously executed and the external charging is not terminated until the temperature Tb of the high-voltage battery 36 reaches the prescribed temperature Tbno or more, it is possible to suppress prolonged time taken to terminate the external charging. Furthermore, in the case C, the warming control is executed until the temperature Tb of the high-voltage battery 36 reaches the prescribed temperature Tblo or more. As a consequence, it is possible to prevent or eliminate freezing of the electrolyte of the high-voltage battery 36. In addition, in the case C, intermittent driving of the battery charger 40 is performed, so that efficiency of the battery charger 40 can be enhanced as compared with the case of continuously driving the battery charger 40.

In the electric vehicle 20 in the embodiment described in the foregoing, during execution of the charging control (cryogenic control) with the start time temperature Tbst of the high-voltage battery 36 being less than the prescribed temperature Tblo (temperature set based on the freezing temperature of the electrolyte of the high-voltage battery 36), the warming control is executed when the temperature Tb of the high-voltage battery 36 is less than the prescribed temperature Tblo after execution of the first constant electric power control (after the voltage Vb of the high-voltage battery 36 reaches the prescribed voltage Vb1 or more during execution of first constant electric power control). When the temperature Tb of the high-voltage battery 36 is equal to or more than the prescribed temperature Tblo, the warming control is not executed. Therefore, when the temperature Tb of the high-voltage battery 36 is less than the prescribed temperature Tblo after the end of execution of the first constant electric power control, the warming control is executed. This makes it possible to perform the external charging while warming the high-voltage battery 36 to prevent or eliminate freezing of the electrolyte of the high-voltage battery 36. When the temperature Tb of the high-voltage battery 36 is equal to or more than the prescribed temperature Tblo after the end of execution of the first constant electric power control, the warming control is not executed. Accordingly, as compared with the case where the warming control is executed when the temperature Tb of the high-voltage battery 36 is less than the prescribed temperature Tbno (and equal to or more than the prescribed temperature Tblo), it is possible to suppress excessive power consumption of the heater 52 in the situation where execution of the warming control is not enough to sufficiently increase the temperature Tb of the high-voltage battery 36 due to such reasons as low outdoor temperature. Moreover, as compared with the case where the warming control is continuously executed and the external charging is not terminated until the temperature Tb of the high-voltage battery 36 reaches the prescribed temperature Tbno or more, it is possible to suppress prolonged time taken to terminate the external charging.

In the electric vehicle 20 of the embodiment, the prescribed temperature Tblo is the freezing temperature of the electrolyte of the high-voltage battery 36 (an upper limit of the temperature range where the electrolyte may freeze). However, the prescribed temperature Tblo may be a temperature slightly higher than the freezing temperature of the electrolyte of the high-voltage battery 36 as long as the temperature is less than the prescribed temperature Tbno.

In the electric vehicle 20 of the embodiment, the first constant electric power control is executed until the voltage Vb of the high-voltage battery 36 reaches the prescribed voltage Vb1 or more, irrespective of the magnitude relation between the start time temperature Tbst of the high-voltage battery 36 and the prescribed temperature Tblo. However, the first constant electric power control may be executed until the state of charge SOC of the high-voltage battery 36 reaches a prescribed state of charge SOC1 or more. Here, the prescribed state of charge SOC1 may take such a value that corresponds to a state of charge SOC of the high-voltage battery 36 when the high-voltage battery 36 is fully charged by execution of the first constant electric power control.

In the electric vehicle 20 of the embodiment, the second constant electric power control is executed until the voltage Vb of the high-voltage battery 36 reaches the prescribed voltage Vb2 or more, irrespective of the magnitude relation between the start time temperature Tbst of the high-voltage battery 36 and the prescribed temperature Tblo. However, the second constant electric power control may be executed until the state of charge SOC of the high-voltage battery 36 reaches a prescribed state of charge SOC2 or more. Here, the prescribed state of charge SOC2 may take such a value that corresponds to a state of charge SOC of the high-voltage battery 36 when the high-voltage battery 36 is fully charged by execution of the second constant electric power control.

In the electric vehicle 20 of the embodiment, irrespective of the magnitude relation between the start time temperature Tbst of the high-voltage battery 36 and the prescribed temperature Tblo, the warming control is executed when the temperature Tb of the high-voltage battery 36 is less than the prescribed temperature Tbno during execution of the first constant electric power control. When the temperature Tb of the high-voltage battery 36 is less than the prescribed temperature Tblo after execution of the first constant electric power control (after the voltage Vb of the high-voltage battery 36 reaches the prescribed voltage Vb1 or more during execution of first constant electric power control), the warming control is executed. However, the warming control may be executed when the start time temperature Tbst of the high-voltage battery 36 is equal to or more than the prescribed temperature Tblo and the temperature Tb of the high-voltage battery 36 is less than the prescribed temperature Tbno, irrespective of whether the first constant electric power control is under execution or the first constant electric power control is terminated. The warming control may be executed when the start time temperature Tbst of the high-voltage battery 36 is less than the prescribed temperature Tblo and the temperature Tb of the high-voltage battery 36 is less than the prescribed temperature Tblo, irrespective of whether the first constant electric power control is under execution or the first constant electric power control is terminated.

In the electric vehicle 20 of the embodiment, when the prescribed-time temperature Tbti of the high-voltage battery 36 is less than the prescribed temperature Tblo, intermittent driving of the battery charger 40 is performed based on the current amount Isum of the high-voltage battery 36. However, the intermittent driving of the battery charger 40 may be performed based on one of the state of charge SOC and the voltage Vb of the high-voltage battery 36. Consider the case where the intermittent driving of the battery charger 40 is performed based on the state of charge SOC of the high-voltage battery 36. For example, when the battery charger 40 is not driven (driving is interrupted), driving of the battery charger 40 may be resumed once the state of charge SOC of the high-voltage battery 36 reaches a prescribed state of charge SOC3 or less, the prescribed state of charge SOC3 being smaller than the prescribed state of charge SOC1 to some extent. When the battery charger 40 is driven, driving of the battery charger 40 may be interrupted when the state of charge SOC of the high-voltage battery 36 reaches a prescribed state of charge SOC4 or more, the prescribed state of charge SOC4 being larger than the prescribed state of charge SOC3 and equal to or less than the prescribed state of charge SOC1. Consider the case where the intermittent driving of the battery charger 40 is performed based on the voltage Vb of the high-voltage battery 36. For example, when the battery charger 40 is not driven, driving of the battery charger 40 may be resumed once the voltage Vb of the high-voltage battery 36 reaches a prescribed voltage Vb3 or less, the prescribed voltage Vb3 being smaller than the prescribed voltage Vb1 to some extent. When the battery charger 40 is driven, driving of the battery charger 40 may be interrupted when the voltage Vb of the high-voltage battery 36 reaches a prescribed voltage Vb4 or more, the prescribed voltage Vb4 being larger than the voltage Vb3 and equal to or less than the prescribed voltage Vb1.

In the electric vehicle 20 of the embodiment, when the prescribed-time temperature Tbti of the high-voltage battery 36 is less than the prescribed temperature Tblo, intermittent driving of the battery charger 40 is performed until the temperature Tb of the high-voltage battery 36 reaches the prescribed temperature Tblo or more. However, continuous driving of the battery charger 40 may be performed instead. When continuous driving of the battery charger 40 is performed, the battery charger 40 needs to be continuously driven such that an absolute value of the output electric power of the battery charger 40 becomes equal to or less than an absolute value of the power consumption of the heater 52 to suppress the overvoltage and overcharge of the high-voltage battery 36.

In the electric vehicle 20 of the embodiment, the constant voltage control is executed after execution of the first constant electric power control and before execution of the second constant electric power control irrespective of the magnitude relation between the start time temperature Tbst of the high-voltage battery 36 and the prescribed temperature Tblo. However, execution of the constant voltage control may be omitted.

In the electric vehicle 20 of the embodiment, the first constant electric power control, the constant voltage control, and the second constant electric power control are executed irrespective of the magnitude relation between the start time temperature Tbst of the high-voltage battery 36 and the prescribed temperature Tblo. However, any control scheme may be adopted, such as executing only the first constant electric power without executing the constant voltage control nor the second constant electric power control, as long as the battery charger 40 is controlled to perform external charging. In this case, the warming control may be executed when the start time temperature Tbst of the high-voltage battery 36 is equal to or more than the prescribed temperature Tblo and the temperature Tb of the high-voltage battery 36 is less than the prescribed temperature Tbno. The warming control may also be executed when the start time temperature Tbst of the high-voltage battery 36 is less than the prescribed temperature Tblo and the temperature Tb of the high-voltage battery 36 is less than the prescribed temperature Tblo. Also in this case, intermittent driving of the battery charger 40 may be performed based on any one of the current amount Isum, the state of charge SOC, and the voltage Vb of the high-voltage battery 36 when the temperature Tb of the high-voltage battery 36 is less than the prescribed temperature Tblo.

The electric vehicle 20 of the embodiment includes the battery charger 40 that charges the high-voltage battery 36 with the electric power from the external power source 90 when the vehicle-side connector 42 and the power source-side connector 92 are connected to each other. However, the electric vehicle 20 may include, in addition to or in place of the battery charger 40, a battery charger that charges the high-voltage battery 36 with the electric power received from the external power source 90 in a non-contact manner.

Figure 7:
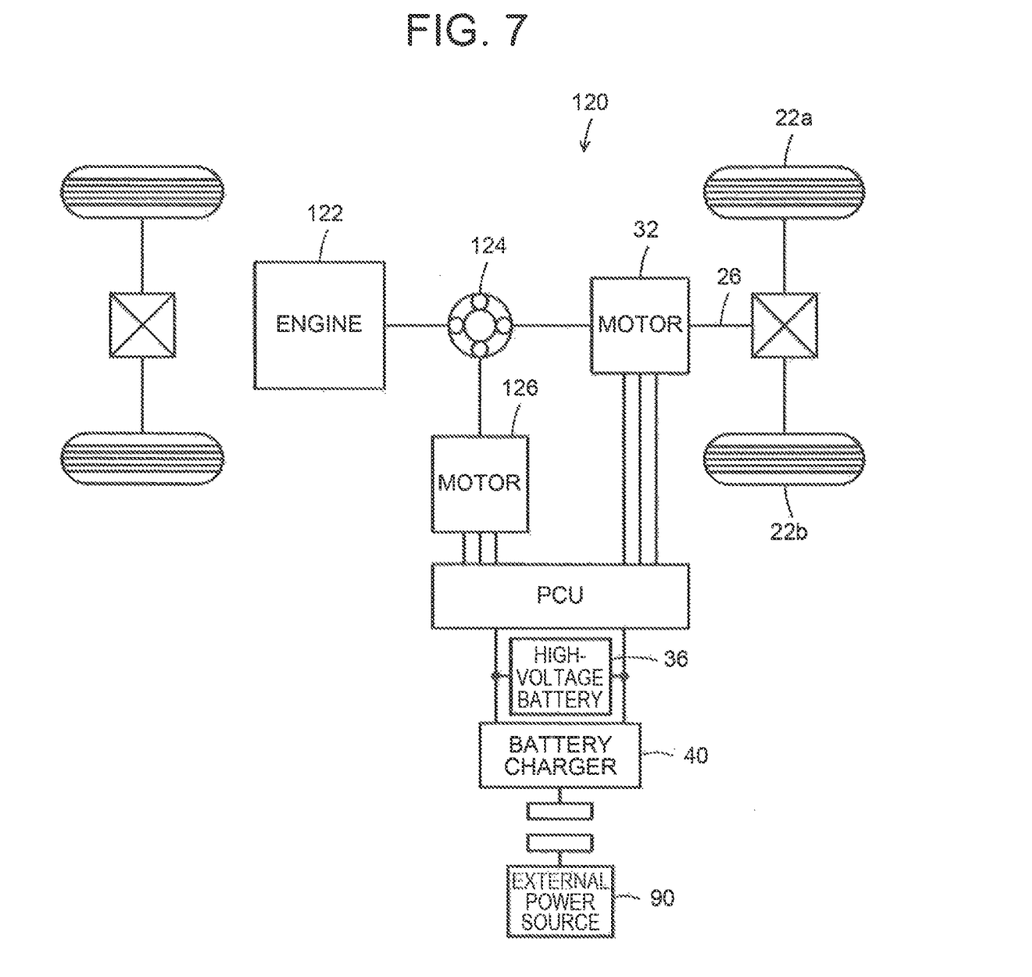
FIG. 7 is a block diagram illustrating an outlined configuration of a hybrid vehicle 120.
Figure 8:
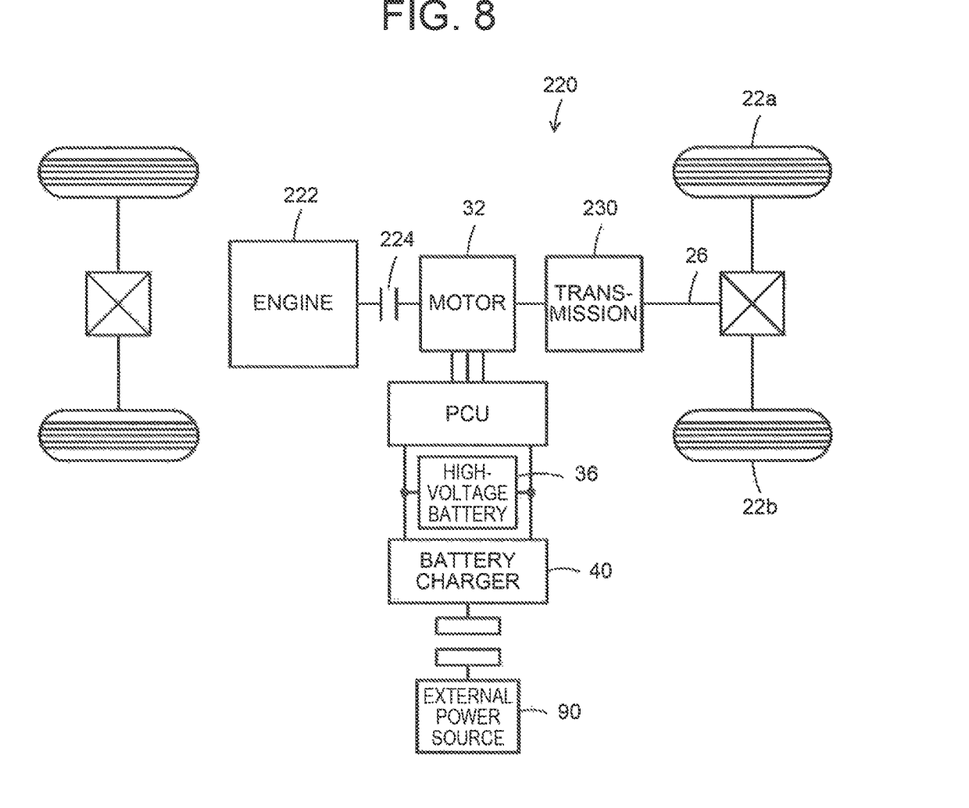
FIG. 8 is a block diagram illustrating an outlined configuration of a hybrid vehicle 220.

Although the electric vehicle 20 configured to include the traveling motor 32 is provided in the embodiment, a hybrid vehicle configured to include not only a traveling motor but also a traveling engine may be provided. For example, as illustrated as a hybrid vehicle 120 of FIG. 7, the hybrid vehicle is configured such that a driving shaft 26 coupled with the driving wheels 22a, 22b is connected to a motor 32 and the driving shaft 26 is additionally connected to an engine 122 and a motor 126 through a planetary gear 124. As illustrated in a hybrid vehicle 220 of FIG. 8, the hybrid vehicle may also be configured such that a driving shaft 26 coupled with driving wheels 22a, 22b is connected to a motor 32 through a transmission 230, and also a rotating shaft of the motor 32 is connected to an engine 222 through a clutch 224.

Correspondence relation between the main elements of the embodiment and the main elements of the present invention described in Summary of the Invention will be described. In the embodiment, the high-voltage battery 36 corresponds to "battery", the battery charger 40 corresponds to "battery charger", the heater 52 corresponds to "warming device", and the electronic control unit 60 corresponds to "control device."

Since the embodiment is one example for specific description of the mode for carrying out the present invention described in Summary of the Invention, the correspondence relation between the main elements of the embodiment and the main elements of the present invention described in Summary of the Invention is not intended to limit the elements of the invention described in Summary of the Invention. More specifically, the invention disclosed in Summary of the Invention should be interpreted based on the description therein, and the embodiment is merely a specific example of the invention disclosed in Summary of the Invention Although the mode for carrying out the present invention has been described using the embodiment, the present invention is not limited in any manner to the embodiment disclosed. It should naturally be understood that the present invention can be carried out in various modes without departing from the scope of the present invention.

The present invention is applicable in the fields such as manufacturing of the vehicle. The vehicle may also be defined as described below. The vehicle includes: a motor for traveling; a battery configured to supply electric power to the motor; a battery charger configured to execute external charging that charges the battery using electric power from an external power source; a warming device connected to an electric power line that is connected to the battery, the warming device being configured to warm the battery; and an electronic control unit configured to execute charging control that controls the battery charger to perform the external charging, and during execution of the charging control, to execute warming control that controls the warming device to warm the battery when temperature of the battery is lower than a second prescribed temperature that is lower than a first prescribed temperature, and not to execute the warming control when the temperature of the battery is equal to or higher than the second prescribed temperature. The electronic control unit may be configured to during execution of the charging control, execute the warming control while the temperature of the battery is lower than the first prescribed temperature in a case where an initial temperature that is a temperature of the battery at a timing of starting of the external charging is equal to or higher than the second prescribed temperature, and execute the warming control while the temperature of the battery is lower than the second prescribed temperature in a case where the initial temperature is lower than the second prescribed temperature. The electronic control unit may be configured to intermittently drive the battery charger as the charging control based on any one of a state of charge of the battery, a voltage of the battery, and a charge-discharge current amount of the battery when the temperature of the battery is lower than the second prescribed temperature. The second prescribed temperature may be a freezing temperature of an electrolyte of the battery. The electronic control unit may be configured to: in a case where an initial temperature that is a temperature of the battery at a timing of starting of the external charging is equal to or higher than the second prescribed temperature, as the charging control, execute first constant electric power control that controls the battery charger such that charging electric power of the battery becomes constant at a first prescribed electric power, execute second constant electric power control that controls the battery charger when a first condition where one of a state of charge of the battery and a voltage of the battery reaches a first threshold value or more is satisfied during execution of the first constant electric power control such that the charging electric power of the battery becomes constant at a second prescribed electric power that is smaller than the first prescribed electric power, and terminate the charging control when a second condition where one of the state of charge of the battery and the voltage of the battery reaches a second threshold value that is larger than the first threshold value or more is satisfied during execution of the second constant electric power control; and in a case where the initial temperature is lower than the second prescribed temperature, as the charging control, execute the first constant electric power control, execute the second constant electric power control when the first condition is satisfied and a prescribed-time temperature that is the temperature of the battery when the first condition is satisfied is equal to or higher than the second prescribed temperature, and terminate the charging control when the second condition is satisfied, execute the second constant electric power control after the temperature of the battery reaches the second prescribed temperature or more, when the first condition is satisfied and the prescribed-time temperature when the first condition is satisfied is lower than the second prescribed temperature, and terminate the charging control when the second condition is satisfied. The electronic control unit may be configured to, irrespective of magnitude relation between the initial temperature and the second prescribed temperature, execute the warming control when the temperature of the battery is lower than the first prescribed temperature during execution of the first constant electric power control, and execute the warming control when the temperature of the battery is lower than the second prescribed temperature after the first condition is satisfied. The electronic control unit may be configured to, when the prescribed-time temperature is lower than the second prescribed temperature, intermittently drive the battery charger as the charging control based on any one of the state of charge of the battery, the voltage of the battery, and a charge-discharge current amount of the battery until the temperature of the battery reaches the second prescribed temperature or more. The electronic control unit may be configured to execute constant voltage control that controls the battery charger after execution of the first constant electric power control and before execution of the second constant electric power control such that the voltage of the battery becomes constant at a prescribed voltage.

What is claimed is:

1. A vehicle, comprising:
   a motor for traveling;
   a battery configured to supply electric power to the motor;
   a battery charger configured to execute external charging that charges the battery using electric power from an external power source;
   a warming device connected to an electric power line that is connected to the battery, the warming device being configured to warm the battery; and
   an electronic control unit configured
   to execute charging control that controls the battery charger to perform the external charging, and
   during execution of the charging control, to execute warming control that controls the warming device to warm the battery when temperature of the battery is lower than a second prescribed temperature that is lower than a first prescribed temperature, and not to execute the warming control when the temperature of the battery is equal to or higher than the second prescribed temperature, wherein the electronic control unit is configured to:
in a case where an initial temperature that is a temperature of the battery at a timing of starting of the external charging is equal to or higher than the second prescribed temperature, as the charging control,
execute first constant electric power control that controls the battery charger such that charging electric power of the battery becomes constant at a first prescribed electric power,
execute second constant electric power control that controls the battery charger when a first condition where one of a state of charge of the battery and a voltage of the battery reaches a first threshold value or more is satisfied during execution of the first constant electric power control such that the charging electric power of the battery becomes constant at a second prescribed electric power that is smaller than the first prescribed electric power, and
terminate the charging control when a second condition where one of the state of charge of the battery and the voltage of the battery reaches a second threshold value that is larger than the first threshold value or more is satisfied during execution of the second constant electric power control; and
in a case where the initial temperature is lower than the second prescribed temperature, as the charging control,
execute the first constant electric power control,
execute the second constant electric power control when the first condition is satisfied and a prescribed-time temperature that is the temperature of the battery when the first condition is satisfied is equal to or higher than the second prescribed temperature, and terminate the charging control when the second condition is satisfied,
execute the second constant electric power control after the temperature of the battery reaches the second prescribed temperature or more, when the first condition is satisfied and the prescribed-time temperature when the first condition is satisfied is lower than the second prescribed temperature, and terminate the charging control when the second condition is satisfied.

2. The vehicle according to claim 1, wherein
the second prescribed temperature is a freezing temperature of an electrolyte of the battery.

3. The vehicle according to claim 1, wherein
the electronic control unit is configured to, irrespective of magnitude relation between the initial temperature and the second prescribed temperature,
execute the warming control when the temperature of the battery is lower than the first prescribed temperature during execution of the first constant electric power control, and
execute the warming control when the temperature of the battery is lower than the second prescribed temperature after the first condition is satisfied.

4. The vehicle according to claim 3, wherein
the electronic control unit is configured to, when the prescribed-time temperature is lower than the second prescribed temperature, intermittently drive the battery charger as the charging control based on any one of the state of charge of the battery, the voltage of the battery, and a charge-discharge current amount of the battery until the temperature of the battery reaches the second prescribed temperature or more.

5. The vehicle according to claim 1, wherein
the electronic control unit is configured to execute constant voltage control that controls the battery charger after execution of the first constant electric power control and before execution of the second constant electric power control such that the voltage of the battery becomes constant at a prescribed voltage.

* * * * *